United States Patent [19]

Roberts

[11] Patent Number: 4,807,429
[45] Date of Patent: Feb. 28, 1989

[54] PROCESS FOR TEDDING OR FLUFFING CUT HAY THAT HAS BEEN COMPACTED BY THE WHEELS OF A TRACTOR

[76] Inventor: Jeffrey S. Roberts, Rt. 2, Box 230, Hudson, Wis. 54016

[21] Appl. No.: 40,249

[22] Filed: Apr. 17, 1987

[51] Int. Cl.$^4$ ............................................. A01D 78/10
[52] U.S. Cl. ........................................ 56/371; 56/192; 56/DIG. 2
[58] Field of Search ............... 56/370, 371, 377, 364, 56/192, 13.6, DIG. 2, 15.5

[56] References Cited

U.S. PATENT DOCUMENTS

| | | | |
|---|---|---|---|
| 438,492 | 10/1890 | Saurer | 56/371 |
| 1,016,655 | 2/1912 | Tisch | 56/371 |
| 3,059,403 | 10/1962 | Bamford et al. | 56/192 |
| 4,418,516 | 12/1983 | Donovan et al. | 56/15.5 |

FOREIGN PATENT DOCUMENTS 492550  5/1953  Canada ................................. 56/370

Primary Examiner—John Weiss

[57] ABSTRACT

The method of the invention mounts a mechanical fluffing or tedding device that is approximately the width of a tractor tire directly in line and behind the left hand wheels of a tractor pulling a hay mowing implement so that the area of previously cut hay that has been compacted by the wheels of the tractor is immediately tedded or fluffed and the area of non-compacted hay is not tedded or fluffed. The drying time of the hay is therefore reduced, due to the elimination of the compacted area that normally dries slower than the hay that is not compacted.

5 Claims, 2 Drawing Sheets

PROCESS FOR TEDDING OR FLUFFING CUT HAY THAT HAS BEEN COMPACTED BY THE WHEELS OF A TRACTOR

SUMMARY

The embodiment of the method that has been invented mounts a mechanical hay fluffer on the tongue of a moving implement so that it extends to the left or right of the tongue and in-line with the directly behind the wheel of the tractor pulling the mower. The mechanical tedder or fluffer, when activated, will fluff the hay that has been compacted by the wheel of the tractor, providing better air flow thru the cut hay and therefore faster drying.

LISTING OF THE DRAWINGS

Figure 1:
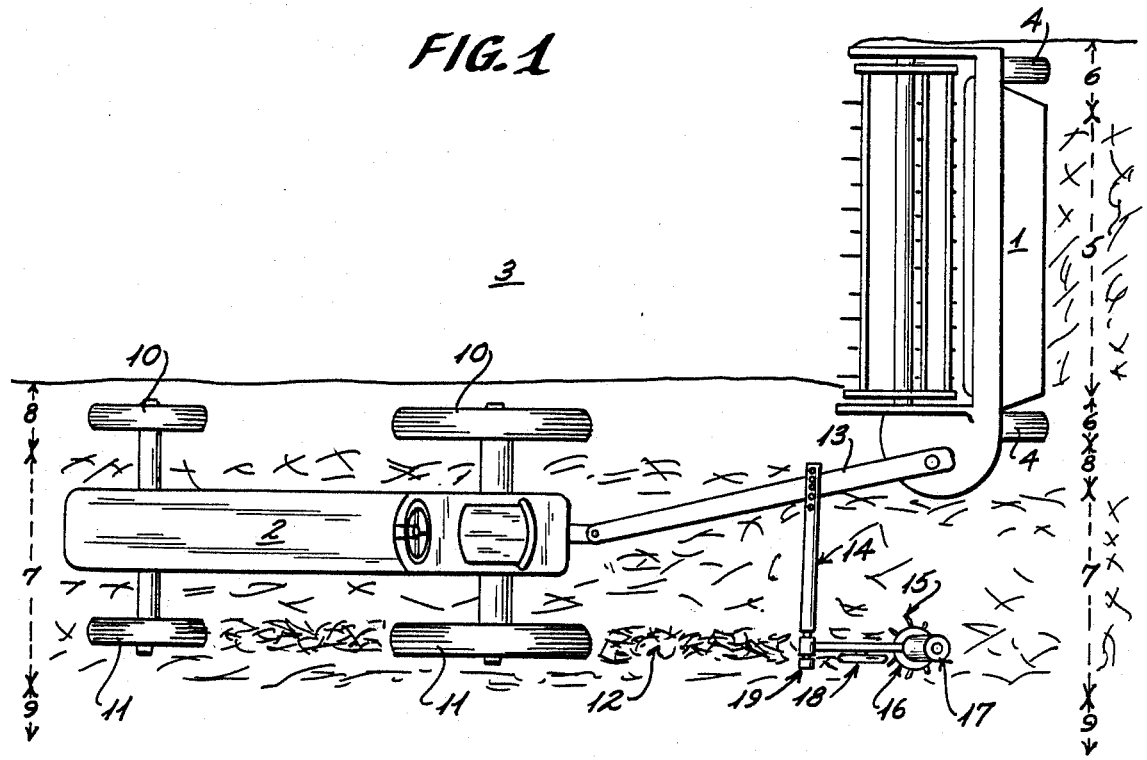

FIG. 1: Top view of a tractor pulling a standard mowing implement positioned to the right of the tractor, with an example of the method mechanically fluffing the cut hay that has been compacted by the left wheels of the tractor.

Figure 2:
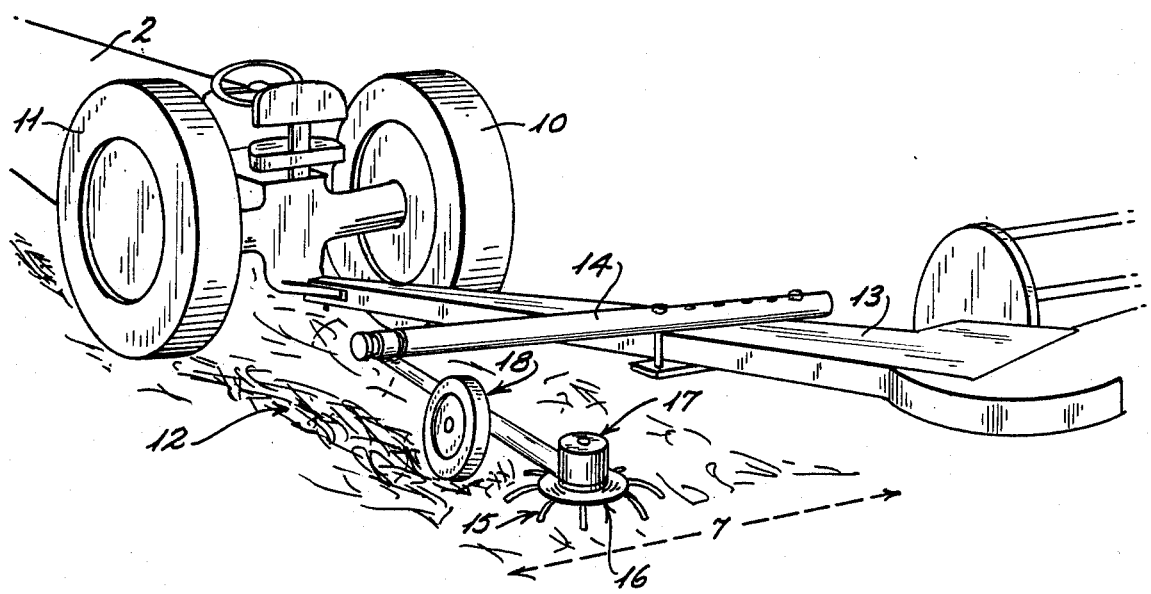

FIG. 2: Rear view of a tractor pulling a standard mowing implement positioned to the right of the tractor, with an example of the method mechanically fluffing the cut hay that has been compacted by the left wheels of the tractor.

Figure 3:
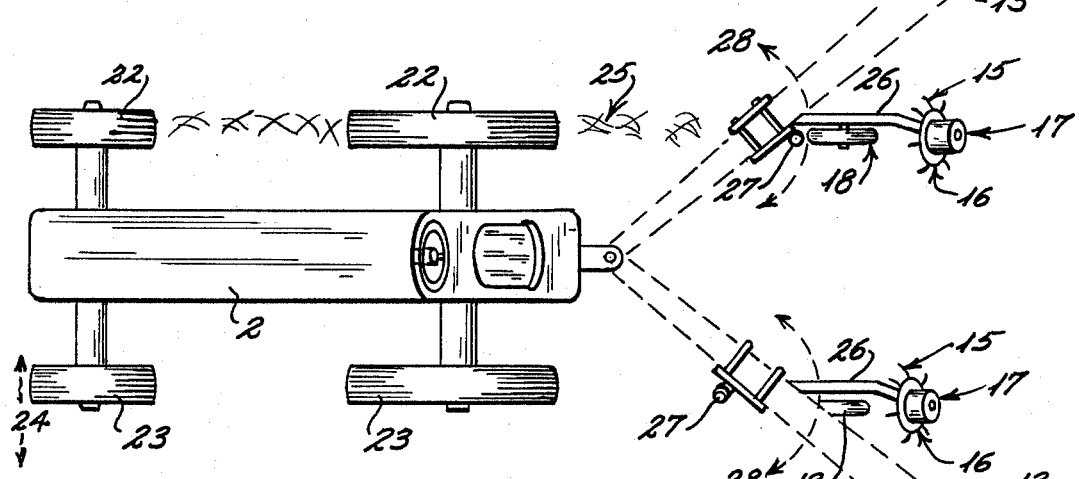

FIG. 3: Top view of a tractor pulling a mowing implement that has a swinging tongue with an example of the method mechanically fluffing the cut hay that has been compacted by the right wheels of the tractor.

Figure 4:
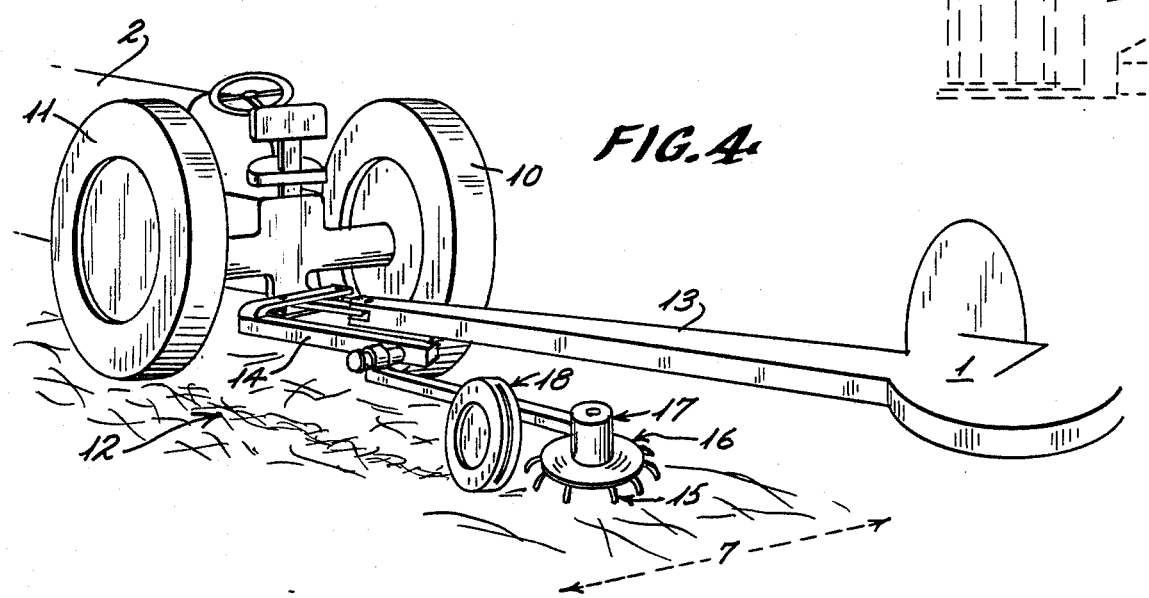

FIG. 4: Rear view of a tractor with an example of the alternative method of lining up the tedder or fluffer with the left hand wheels of the tractor by mounting the tedder or fluffer to the draw bar of the tractor.

BACKGROUND

Hay crops are typically 70% moisture or above at the time they are cut. This plant material must dry down to 50% moisture to be harvested as silage or down to 15% moisture to be harvested as baled hay. This drying process normally takes place after the hay is cut, and laying in the field. As hay is drying in the field, it is subject to reductions in feeding quality due to damages from weathering, rain and respiration. The feeding quality of hay is inversely proportional to the hours of drying time, and therefore, producers of hay are interested in reducing the drying time of hay laying in the field. Implements have been used to fluff the hay as it is laying in the field. These implements have been designed to rearrange the hay to provide for better air movement thru the plant material and to increase the drying rate. P. Saudie, Agriculture Canada, found that use of a tedder type implement increased drying rate by 74% in cut hay (case paper 86-201, July 7, 1986). Implements in this study and implements in general use are designed to handle an area of hay cut and laying in the field between seven and eighteen feet wide. The use of these implements normally occurs during the time the hay is in the 60% to 30% moisture range, or after the hay has dried in the field for five hours to three days. Operating the standard fluffing implement is done by pulling it, normally behind a tractor, as a separate pass thru the field when the hay is drying. Hay can be cut with a specialized self-propelled implement or with an implement pulled behind a standard farm tractor. Implements of the pulled type are sickle bar, disc and flail mowers. Each of these three types of mowers have been combined with mechanical conditioning rolls to comprise a mower-conditioner, which is the most common implement in use for cutting hay that will be harvested as silage or baled hay. The mower-conditioner 1, is normally pulled behind and to the right of a standard farm tractor 2, so that the tractor does not run down the standing hay 3, hay field is cut from left to right, with the tractor running to the left of the standing hay, and the mower-conditioner pulled behind and to the right of the tractor. Many types of mower-conditioners are designed to lay the cut hay down on the ground as wide as possible, In this way, the density of the hay laying out to dry, will be minimized, air flow thru the hay will be maximized and the rate of drying will be faster than if the hay was layed in a narrower pattern. The most common design for mower-conditioners has the wheels of this implement 4, mounted behind the cutting device and the cut hay layed out to the maximum width between the wheels 5, in this way the wheels of the mower-conditioner will not compact the hay that has just been cut, and there will be two wheel paths 6, from the mower on each pass. Mowers are commonly available in seven to sixteen foot cutting widths. Those implements that lay out a wide deliver of hay, normally lay a swath of hay just under the cutting width of the machine, so that the only place hay is not laying is in line with the wheels of the mower 6. Mowers typically incorporate a provision so that the angle of the tongue can be adjusted to line the tractor up with the wheel paths, 8 and 9, of the mower on the previous cut pass. In cases where the width of the tractor's wheels are narrower than the width of the mower's wheels, the right hand wheels of the tractor 10, are normally led up with the right hand wheel path of the mower 8. The left hand wheels of the tractor 11, will then run on the previously cut hay 7, leaving a track of compacted hay 12, on each pass. This area of compacted hay will dry slower than the remainder of the cut hay laying out in the field. This effect was demonstrated in a test June 18 and 19, 1984 conducted by the inventor at the S & M Dairy Farm at Belleville, Ill. The hay was cut with a New Holland brand, 495 model, mower-conditioner, and layed in a path nine feet wide. The mower-conditioner was pulled by an International brand model 856 tractor with a wheel width of seven feet. The tractor's right hand wheels were lined up with the right hand wheel path made by the mower-conditioner, the left hand wheels of the tractor ran on the previously cut hay creating an area of compaction about fourteen inches wide. Moisture of the hay in the compacted area compared to hay adjacent to the compacted area was tested with a Dicky-John forage moisture tester:

|  | MOISTURE OF HAY IN AREA COMPACTED BY THE WHEEL | MOISTURE OF HAY IN ADJACENT AREA OF SWATH |
|---|---|---|
| June 18 - 5:00 P.M. | 60% | 58% |
| June 19 - | | |
| 10:00 A.M. | 55% | 50% |
| 12:00 NOON | 46% | 38% |
| 2:00 P.M. | 40% | 32% |
| 4:00 P.M. | 32% | 21% |
| 6:00 P.M. | 29% | 16% |

In this test the higher moisture material in the area compacted by the tractor wheel prevented the hay from being baled on June 19, since the hay in the adjacent area had reached the required moisture level to allow for baling. The method that has been invented immediately fluffs the area of hay compacted by the tractor's wheel that has run over the previously cut swath. In the embodiment of this method with a mower-conditioner with a standard tongue, the tongue is used as the mounting point for a device to mechanically fluff the hay compacted by the tractor's left hand wheels 11. A mounting arm 14, is extended to the left of the tongue. A mechanical fluffing or tedding device is mounted on the end of the mounting arm. As an alternative, the mounting arm can also be attached to the draw bar of the tractor or on the axel or frame of the tractor. In all the embodiments of the method the mounting arm will hold the tedding or fluffing device behind and directly in line with the left hand wheels of the tractor pulling the mowing implement. adjustable, so that these tines will pick the hay up and throw is about as the wheel to which they are mounted rotates between 50 and 1000 revolutions per minute. The mechanical fluffing device can be of different varieties that are in commom use in the full size fluffers and tedders. Other varieties include: 10" to 24" tines mounted on a reel that rotates around a horizontal axis, picking up the hay and setting it down in a higher profile; and a brush rotating on a horizontal axis, riding close to the ground, that picks up the hay and moves it over the brush and drops it behind the brush as it travels through the field; other types of fluffers or tedders that are designed to rearrange the hay can be used, but in all embodiments of the method the area covered by the tedder or fluffer is equal to or just wider than the area of hay compacted by the wheels of the tractor. The tedding or fluffing device can be powered by a motor 17, run hydraulically or electrically or by a momentum driven wheel mounted ahead of the tedding device 18. The wheel can also act as a gauge wheel in conjunction with a swivel 19, to allow for pivoting of the tedding device around a horizontal axis. The gauge wheel will retain a constant height of the device above the hay as it pivots on the swivel, independent of vertical movement of the tongue 13, which is moved up and down by vertical movement of the tractor wheels 10 and 11, and the mower wheels 4. An alternative to the standard mower-conditioner, or mower, pulled to the right of the tractor, is an implement with a swinging tongue 20, so that the mower-conditioner 21, can be alternately moved to the left or right of the tractor. Employing this implement the tractor can cut one pass with the mower to the right of the tractor and return in the opposite direction with the mower to the left of the tractor. The tractor will always be running outside the standing hay using this method. The embodiment of the process when used with a swinging tongue type mower, teds or fluffs the hay compacted by the tractor's right hand wheels 22. The left hand wheels of the tractor 23, are lined up with the left hand wheel track from the previously cut pass 24, leaving a compacted area of hay 25, from the right hand wheels of the tractor 22, if the hay is layed out by the mower in a width wider than the width of the tractor wheels. The mounting arm 26, in this embodiment is mounted on the swinging tongue. A swivel 27, is placed at the point of attachment of the mounting arm to the tongue, allowing the arm to rotate around a horizontal axis 28. A gauge wheel 18, is mounted on the opposite end of the mounting arm so that it runs on the ground ahead of the tedding or fluffing device. When the mower is positioned to the right of the tractor, the mounting arm is positioned to the left of the tongue behind and in line with the right hand wheels of the tractor. When the mower is positioned to the left of the tractor, the mounting arm rotates to a position to the right of the tongue along path 28, so that it is behind and directly in line with the left hand wheels of the tractor. The rotation of the mounting arm is accomplished by mounting it so that clearance is provided below the tongue of the mower.

What is claimed:

1. A method to ted or fluff the area of hay that has been compacted by the wheels of a tractor running on a previously formed windrow or swath as the tractor pulls a mowing implement thru adjacent standing hay, by mounting behind the tractor a tedding or fluffing device of a width equal to or just wider than the area of hay compacted by the wheels of the tractor, so that the tedding or fluffing device is lined up with the wheel of the tractor that is compacting the area of hay and the area of hay compacted by the wheels of the tractor is tedded or fluffed and the area of hay in the windrow or swath, that is not compacted by the wheels of the tractor is not tedded or fluffed.

2. A method as in claim 1 wherein the tedding or fluffing device is mounted on the tractor.

3. A method as in claim 1 where the tedding or fluffing device is mounted to a tongue of the mowing implement.

4. A method as in claim 1 wherein a mounting arm holds the tedder or fluffer behind the tractor by a swivel connection allowing for rotation around a horizontal axis and a gauge wheel is attached to the mounting arm so that the tedding or fluffing device can move up and down independent of vertical movement of the tractor and mower.

5. A method as in claim 1 in which a tedding or fluffing device is mounted with a mounting arm to a mowing implement that has a swinging tongue that allows the mowing implement to be positioned to the left or right of the tractor, when the mounting arm is attached to the swinging tongue of the mower with a swivel connection allowing the arm to rotate around a vertical axis and a gauge wheel attached to the opposite end of the mounting arm so the tedding device will be positioned to the left of the tongue and line up with the right hand wheels of the tractor when the mowing implement is positioned to the right of the tractor and the tedding device will be positioned to the right of the tongue and line up with the left hand wheels of the tractor when the mowing implement is positioned to the left of the tractor.

* * * * *